(12) United States Patent
Yang et al.

(10) Patent No.: US 8,363,584 B2
(45) Date of Patent: Jan. 29, 2013

(54) EQUIPMENT AND METHOD FOR PROVIDING BROADCAST/MULTICAST SERVICE IN MOBILE COMMUNICATIONS

(75) Inventors: Peng Yang, Beijing (CN); Yuanchen Ma, Beijig (CN); Yi Zhang, Beijing (CN); Hui Deng, Beijing (CN); Hideya Yoshiuchi, Beijing (CN); Koji Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 952 days.

(21) Appl. No.: 12/071,665

(22) Filed: Feb. 25, 2008

(65) Prior Publication Data

US 2008/0291861 A1 Nov. 27, 2008

(30) Foreign Application Priority Data

May 21, 2007 (CN) .......................... 2007 1 0104191

(51) Int. Cl.
*H04H 20/71* (2008.01)
*H04W 4/00* (2009.01)
*H04J 3/26* (2006.01)
(52) U.S. Cl. ........ 370/312; 370/328; 370/329; 370/332; 370/432; 370/338
(58) Field of Classification Search .................... 370/312
See application file for complete search history.

(56) References Cited

U.S. PATENT DOCUMENTS

| | | | |
|---|---|---|---|
| 2002/0071447 A1* | 6/2002 | Shinomiya et al. | 370/468 |
| 2005/0282571 A1* | 12/2005 | Oprescu-Surcobe et al. | 455/503 |
| 2006/0159069 A1 | 7/2006 | Parekh et al. | |
| 2007/0165562 A1* | 7/2007 | Bourlas et al. | 370/328 |

FOREIGN PATENT DOCUMENTS

| | | |
|---|---|---|
| JP | 2007-535246 | 11/2007 |
| WO | WO 2005-107216 | 11/2007 |

OTHER PUBLICATIONS

"Interoperability Specification (IOS) for Broadcast Multicast Services (BCMCS)", Version 1.0, Oct. 2006, 3rd Generation Partnership Project 2, Publication Version, pp. i-x and 1-1 to 1-6, 3-1 to 3-4. 4-1 to 4-10, 5-1 to 5-2. 6-1 to 6-36, 7-1 to 7-46, 8-1 and 9-1 to 9-2.
"Broadcast and Multicast Service in cdma2000 Wireless IP Network", Version 1.0, Revision A, Feb. 16, 2007, 3rd Generation Partnership Project 2, , pp. i-ix and 1-131.
Office Action issued from Japanese Patent Office, in corresponding Japanese Patent Application No. 2008-132062, dated Oct. 2, 2012, 6 pages in Japanese, and 1 page of partial English translation.

* cited by examiner

*Primary Examiner* — Ian N Moore
*Assistant Examiner* — Jenee Alexander
(74) *Attorney, Agent, or Firm* — Stites & Harbison, PLLC; Juan Carlos A. Marquez, Esq.

(57) ABSTRACT

A communications controller according to the present invention includes a network interface, and a control unit for, when the network interface receives a request information for requesting establishment of a new multicast communications flow, judging whether or not the new multicast communications flow can be established with respect to a base station, based on communications quality parameters of the other multicast communications flows already established with a plurality of base stations, and a communications quality parameter of the new multicast communications flow, the new multicast communications flow being to be transferred by way of the base station, and establishing the new multicast communications flow if result of the judgment on the base station is YES, the new multicast communications flow being to be transferred by way of the base station.

15 Claims, 12 Drawing Sheets

FIG.11

| 231-1 | 231-2 | 231-3 | 231-4 | 231-5 | 231-6 | 231-7 | 231-8 |
|---|---|---|---|---|---|---|---|
| BASE STATION 1 ANID1:0x0401 | IP ADDRESS 10.10.12.227 | BCMCS_GRE_ID1:0x0001 | RESOURCE LIMITATION IN BASE STATION 1 BANDWIDTH: 128 kbps, ETC. | BCMCS_FLOW_ID1 MULTICAST ADDRESS/PORT 0x4001 225.0.0.10/10093 | FLOW DESCRIPTION PoC, 30kbps, 50pps, 30s, etc. | SESSION STATUS idle | OTHERS |
| | | | | BCMCS_FLOW_ID2 MULTICAST ADDRESS/PORT 0x4002 225.0.0.11/10093 | FLOW DESCRIPTION VoIP, 20kbps, 50pps, Silence detection, etc. | SESSION STATUS active | OTHERS |
| | | | | ...... | ...... | ...... | ...... |
| | | | | BCMCS_FLOW_IDn MULTICAST ADDRESS/PORT 0x4003 225.0.0.12/10093 | FLOW DESCRIPTION Download, 64kbps, etc. | SESSION STATUS active | OTHERS |
| BASE STATION 2 ANID2:0x0402 | IP ADDRESS 10.10.12.228 | BCMCS_GRE_ID2:0x0002 | RESOURCE LIMITATION IN BASE STATION 2 BANDWIDTH: 192 kbps, ETC. | BCMCS_FLOW_ID1 MULTICAST ADDRESS /PORT | FLOW DESCRIPTION | SESSION STATUS | OTHERS |
| | | | | BCMCS_FLOW_ID2 MULTICAST ADDRESS /PORT | FLOW DESCRIPTION | SESSION STATUS | OTHERS |
| | | | | ...... | ...... | ...... | ...... |
| | | | | BCMCS_FLOW_IDn MULTICAST ADDRESS /PORT | FLOW DESCRIPTION | SESSION STATUS | OTHERS |

231-9 brackets columns 231-5 through 231-8 (first row group); 231-10 indicates the second row group.

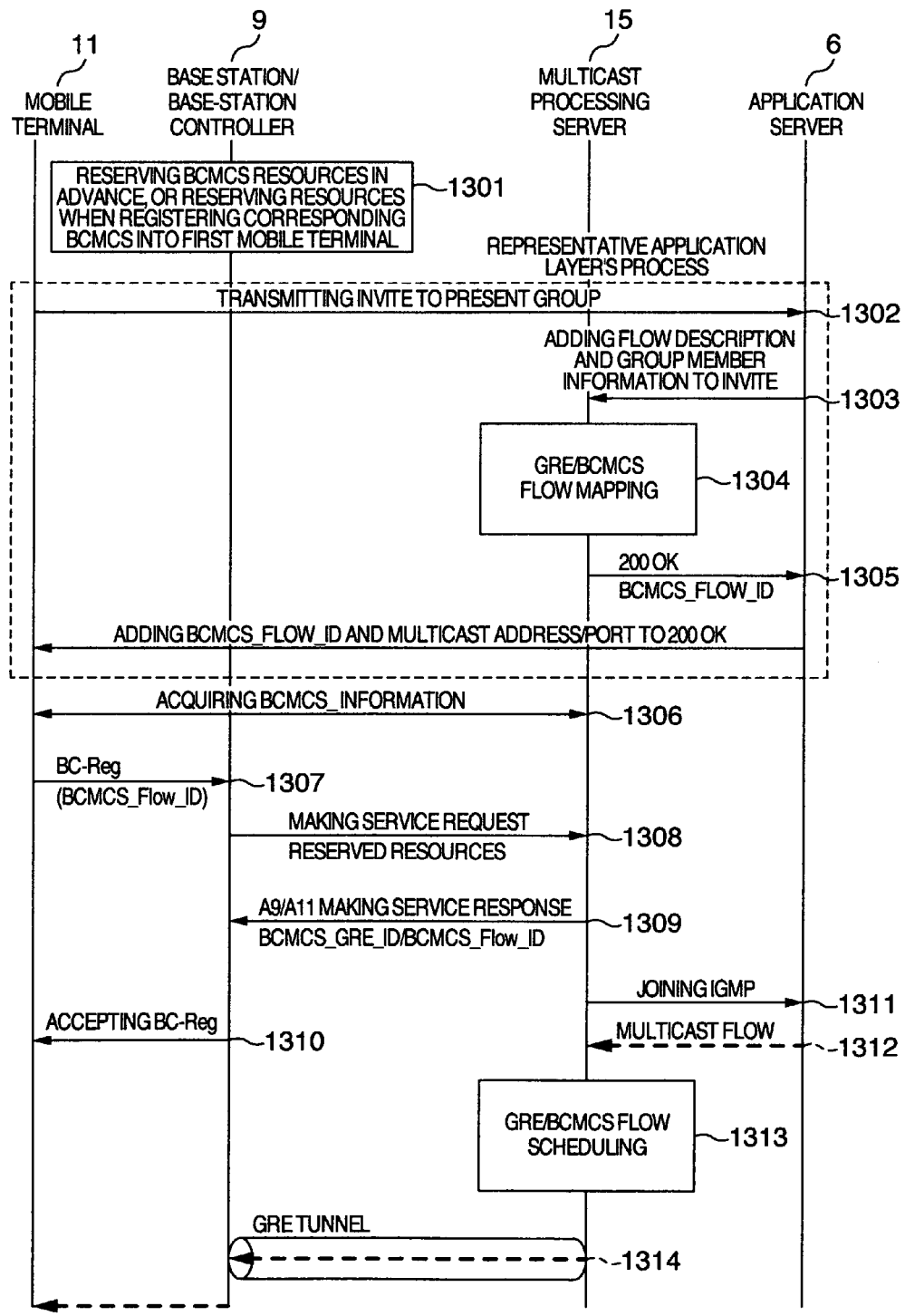

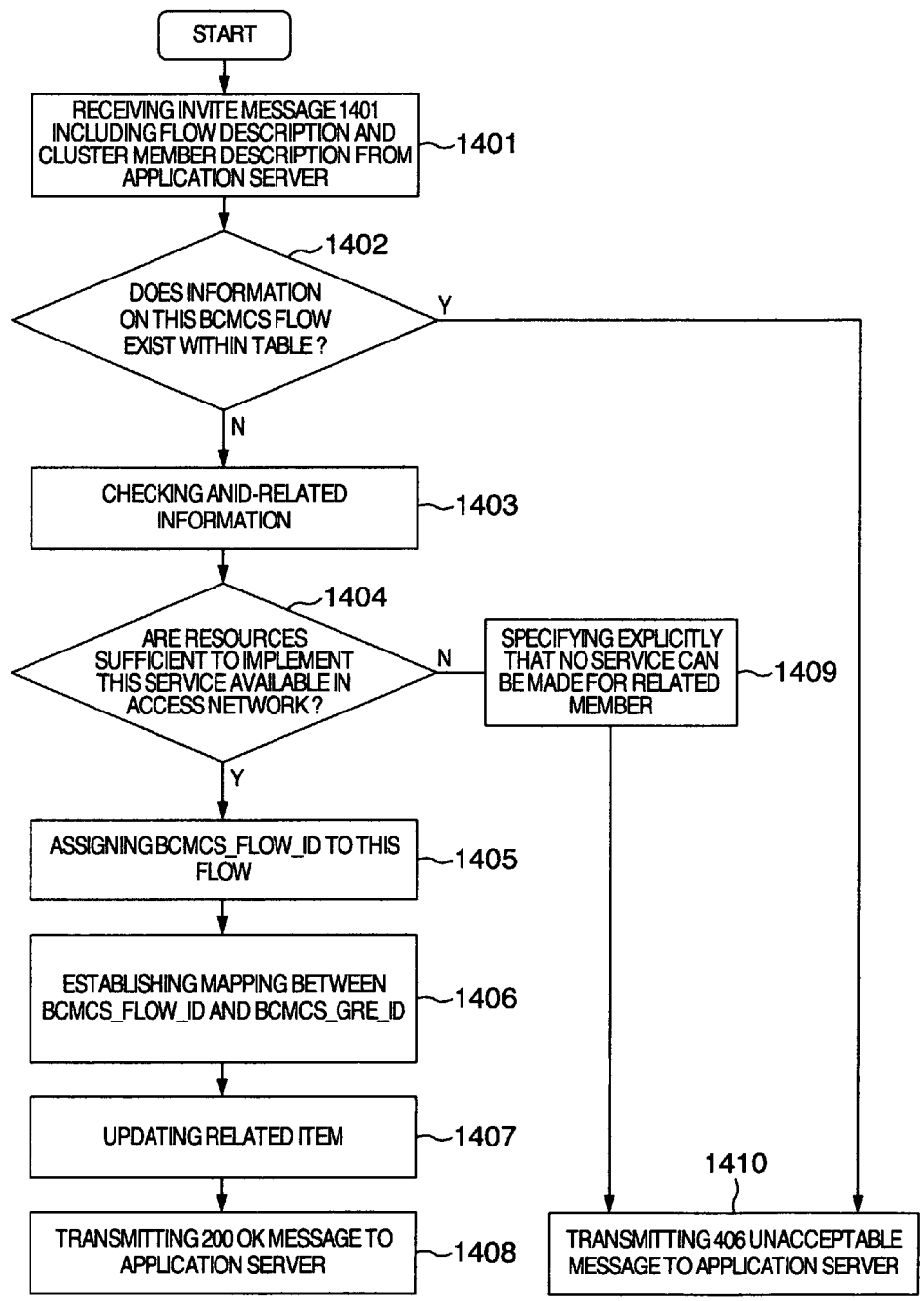

EQUIPMENT AND METHOD FOR PROVIDING BROADCAST/MULTICAST SERVICE IN MOBILE COMMUNICATIONS

INCORPORATION BY REFERENCE

The present application claims priority from Chinese application CN200710104191.6 filed on May 21, 2007, the content of which is hereby incorporated by reference into this application.

BACKGROUND OF THE INVENTION

The present invention relates to equipment and method for providing service in a mobile communications network. More particularly, it relates to a multicast processing server in a mobile communications system. What is referred to as "mobile communications network" here means a broadcast and multicast communications-capable mobile communications system.

3GPP2 (: 3rd Generation Partnership Project 2) is the international standardization alliance, whose target is to develop system structure and standards of the 3rd-generation mobile communications network. These standards are applied to the network of CDMA2000 aerial interface. In the 3GPP2 alliance, broadcast/multicast service (BCMCS) of CDMA2000 has been proposed. BCMCS addresses and executes one-point-to-plural-points transmission of multimedia data transmitted from a single source-node. The main object of BCMCS is to make the optimum use of aerial interface resources of CDMA2000, when the BCMCS multimedia data is transferred to one or plural mobile terminals in the CDMA2000 network system of a provider.

FIG. 1 is a schematic diagram for illustrating distribution of BCMCS-system function nodes proposed by the 3GPP2 alliance. FIG. 3 illustrates transfer mechanism of a BCMCS packet based on 3GPP2-compatible X. S0022 and A. S0019. One BCMCS_FLOW_ID is assigned to each BCMCS data flow (which corresponds to one multicast address and port). In the access network, the BCMCS data flows are transferred in such a manner that they are encapsulated into generic routing encapsulation (GRE) tunnels. The BCMCS data flows and the GRE tunnels are strictly brought into a one-to-one correspondence relationship with each other. One GRE identifier (GRE key or GRE ID) exists for each GRE tunnel. In other words, the GRE identifiers, the BCMCS_FLOW_IDs, and the BCMCS data flows are strictly brought into a one-to-one correspondence relationship with each other.

In FIG. 1, a source media flow is transmitted from a BCMCS contents provider 104. A BCMCS contents server 6 receives source media flows transmitted from a plurality of BCMCS contents providers 104, then processing the source media flows. After that, the server 6 transfers generated BCMCS data flows to a CDMA2000 Radio Access Network (RAN) via a multicast service node (BSN) 4. Every packet control function unit 5 (PCF) and every base station/base-station controller (BS/BSC) equipment 9 can create and deliver backups of an IP multicast packet. A BCMCS controller 8 is a piece of core net equipment, and its function is to manage BCMCS-session-related information, and to provide the information to a packet data service node (PDSN) 3, the multicast service node 4, mobile terminals 10, and the BCMCS contents server 6. The BCMCS controller 8 transmits the BCMCS-session-related information to the packet data service node 3 and the multicast service node 4 via an interface 102 and by way of an authentication-authorization-accounting server 1. An interface 103 is used for providing already-existing BCMCS-session-related information to the mobile terminals 10. This interface is referred to as "BCMCS information acquisition interface" as well. Also, the BCMCS controller 8 is in charge of security function partially, such as generating security keys and distributing the keys to the mobile terminals 10. The BCMCS controller 8 also performs authentication with respect to the BCMCS contents providers 104, thus allowing the BCMCS contents server 6 to control the BCMCS contents providers 104 to transfer the source media flows.

FIG. 2 is a diagram for illustrating an embodiment of cluster-communications system application based on BCMCS. This is an embodiment resulting from setting PoC (:Push-to-Talk over Cellular) as a cluster application. Assume that three clusters exist in PoC. Session control is performed based on Session Initiation Protocol (SIP), and management within each cluster is performed based on Real Time Control Protocol. In FIG. 2, reference numeral 6 denotes a cluster server, which has functions corresponding to those of the BCMCS contents server 6 and the BCMCS contents providers 104 in FIG. 1. Numeral 2 denotes a unicast packet control function unit for controlling a unicast packet. Numeral 7 denotes a SIP server, which has a session-establishing function.

In FIG. 2, there exist two base stations 9 which are in charge of two independent honeycomb cells 10. Two cluster mobile terminals 11 exist within each cluster. When one mobile terminal 11 within a cluster talks, the mobile terminal 11 transmits a unicast data flow to the cluster server 6 via an ascendant link of the mobile communications network. Having received the unicast data flow from the mobile terminal 11, the cluster server 6 checks the session information first. After that, the cluster server 6 transmits the corresponding contents to the mobile communications network by multicast communications. The multicast packets are captured by a multicast service node 4, thereby being transferred to the access network of the mobile communications network in a manner of being encapsulated. The IP multicast flows corresponding to the cluster are converted into BCMCS data flows by being processed by a packet control function unit 5 and a base station/base-station controller 9. After that, the BCMCS data flows are transmitted to BCMCS channels of aerial interface. Monitoring the aerial interface channel corresponding to the cluster allows the mobile terminal 11 within the cluster to receive data within the cluster. Accordingly, the aerial interface resources within the mobile communications network can significantly be saved by supporting the cluster service based on BCMCS.

FIG. 3 is the diagram for illustrating the flow of the BCMCS data transfer in the embodiment in FIG. 2. When the three clusters exist, the cluster server 6 transmits three multicast data flows to the mobile communications network. As a result, three BCMCS data flows exist correspondingly in the access network. The BCMCS data flows are encapsulated into the GRE tunnels 13. The BCMCS data flows and the GRE tunnels are brought into a one-to-one correspondence relationship with each other.

In the base station/base-station controller 9, reserve of the aerial interface resources is performed based on the GRE tunnels. In the present embodiment, if a certain base station can support only 192-kbps BCMCS flow amount, and if the base station is required to support the three BCMCS data flows, flow amount of each BCMCS data flow must be smaller than 64 kbps. In the case of PoC, if a member to talk with does not exist within a certain cluster, data to be transmitted within the cluster does not exist, either. If a member to talk with does not exist in all of the cluster communications groups, the aerial interface resources reserved will be wasted.

Also, if the present base station can support only 128-kbps BCMCS rate at the maximum, and if bandwidth of each cluster communications group is equal to 80 kbps at the minimum (i.e., when G.711 voice code is used), the base-station controller (BSC) 9 finds it impossible to assign the aerial interface resources to the three cluster communications groups, but finds it possible to assign the aerial interface resources to only one BCMCS data flow (which corresponds to one cluster communications group). Also, when a plurality of GRE tunnels are in a one-to-one correspondence relationship with a plurality of BCMCS data flows, the base station/base-station controller 9 is required to create and manage a plurality of buffering queues correspondingly, and to manage all of the GRE tunnels and buffering queues by performing a large number of complicated manipulations. This requirement, in some cases, delays transfer of the BCMCS data, thereby exerting an influence on performance of the cluster communications. It is conceivable that this influence is not at all negligible for the cluster communications, i.e., the delay-sensitive application.

FIG. 4 is a diagram for illustrating format of an IP packet of the multicast data flow. This is the standard IP multicast packet. A source address 121 is an IP address of the cluster server 6. A destination address 122 is multicast addresses assigned to the cluster communications groups. Pure load 123 of the IP multicast packet plays a role of transferring the session data. Packet format of the BCMCS data flow is basically the same as that of the IP multicast data flow.

FIG. 5 is a diagram for illustrating IP packet format of the GRE tunnel in the access network. The GRE tunnel is a method for implementing the general-purpose encapsulation. Start portion of the GRE packet head is a partial GRE data field used for storing a certain protocol and strategy. GRE identifier (GRE ID) 136, which is an identifier for the GRE tunnel, is uniquely assigned into cover area of a certain access network. The multicast packet is encapsulated into the IP multicast packet 122.

FIG. 6 is a diagram for illustrating the situation of representative data flow in the PoC service. Here, there is an exceedingly important feature that, if no one is talking within a cluster, no data will be transferred within the cluster. In this case, the aerial interface resources assigned to the cluster service will completely be wasted. In the 3GPP2 alliance, the multicast node server finds it impossible to grasp usage situation of the BCMCS resources at a related base station. As a result, the multicast node server can perform only the transfer of a simple BCMCS frame, thus finding it impossible to perform further analysis and scheduling.

SUMMARY OF THE INVENTION

It is an object of the present invention to provide a communications controller and method for solving low efficiency of the BCMCS data processing in a mobile network, and a problem of being incapable of performing the dynamical multicast broadcast processing based on the usage situation at mobile terminals.

The present invention provides a communications controller which is linked to an application server by way of a network interface, and which is linked further to a plurality of terminals by way of a plurality of base stations. The communications controller includes the network interface for receiving information from the application server, and transmitting the information to the plurality of base stations by utilizing multicast communications flows, the multicast communications flows being established between the application server and the plurality of base stations, and a control unit for, when the network interface receives a request information for requesting establishment of a new multicast communications flow, judging whether or not the new multicast communications flow can be established with respect to a base station, based on communications quality parameters of the other multicast communications flows already established between the application server and the plurality of base stations, and a communications quality parameter of the new multicast communications flow, the new multicast communications flow being to be transferred by way of the base station, and establishing the new multicast communications flow if result of the judgment on the base station is YES, the new multicast communications flow being to be transferred by way of the base station.

The present invention provides a communications control method for receiving information from an application server, and transmitting the information to a plurality of base stations by utilizing multicast communications flows, the multicast communications flows being established between the application server and the plurality of base stations.

The communications control method includes a reception step of receiving, from the application server, a request information for requesting establishment of a new multicast communications flow, a judgment step of judging whether or not the new multicast communications flow can be established with respect to a base station, based on communications quality parameters of the other multicast communications flows already established between the application server and the plurality of base stations, and a communications quality parameter of the new multicast communications flow, the new multicast communications flow being to be transferred by way of the base station, and a multicast-communications-flow establishment step of establishing the new multicast communications flow if result of the judgment on the base station is YES, the new multicast communications flow being to be transferred by way of the base station.

Other objects, features and advantages of the invention will become apparent from the following description of the embodiments of the invention taken in conjunction with the accompanying drawings.

BRIEF DESCRIPTION OF THE DRAWINGS

FIG. 11 is a diagram for illustrating representative structure of a GRE/BCMCS flow correspondence table according to the present invention;

FIG. 12 is a diagram for illustrating a message for establishing a dynamic BCMCS data flow according to the present invention;

FIG. 13 is a diagram for illustrating representative flow of the dynamical data flow mapping established inside the multicast processing server according to the present invention;

DESCRIPTION OF THE INVENTION

Hereinafter, the explanation will be given below concerning the present invention, selecting the CDMA2000 1xEVDO BCMCS communications system as its example. The present invention is also applicable to multicast broadcast services of the other mobile communications networks.

Figure 7:
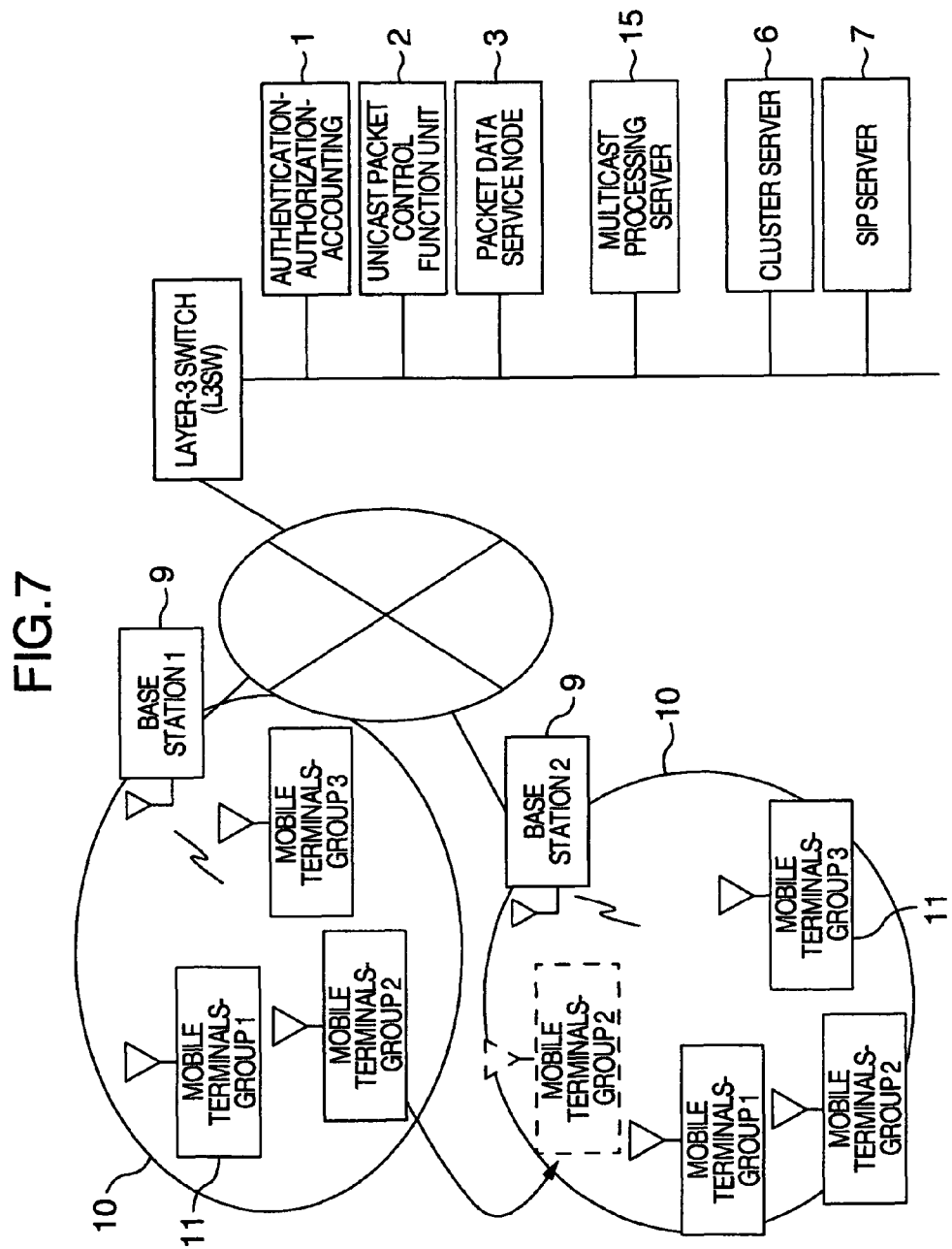
FIG. 7 is a diagram for illustrating an embodiment of the BCMCS cluster-communications system which uses a multicast processing server proposed in the present invention.

FIG. 7 is a diagram for illustrating an embodiment of the BCMCS cluster-communications system which uses a multicast processing server proposed in the present invention.

Assume that three clusters exist in PoC illustrated in FIG. 7. In FIG. 7, reference numeral 1 denotes the authentication-authorization-accounting server, 2 denotes the unicast packet control function unit for controlling a unicast packet, 3 denotes the packet data service node, 6 denotes the cluster server, and 7 denotes the SIP server which has a session-establishing function.

In the embodiment in FIG. 7, there exist the two base stations 9 which are in charge of the two independent honeycomb cells 10. The two cluster mobile terminals 11 exist within each cluster.

Figure 1:
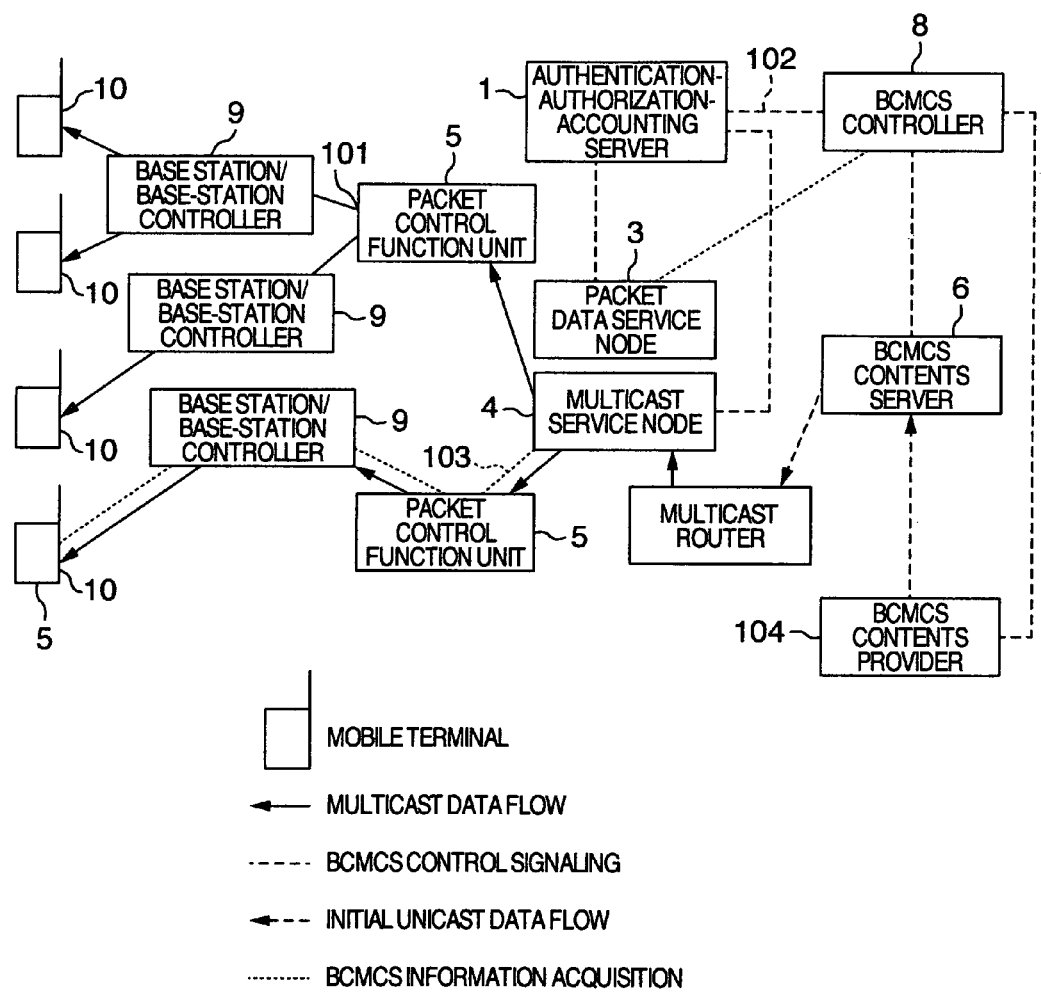
FIG. 1 is the diagram for illustrating the structure of the BCMCS system in the mobile communications network.
Figure 2:
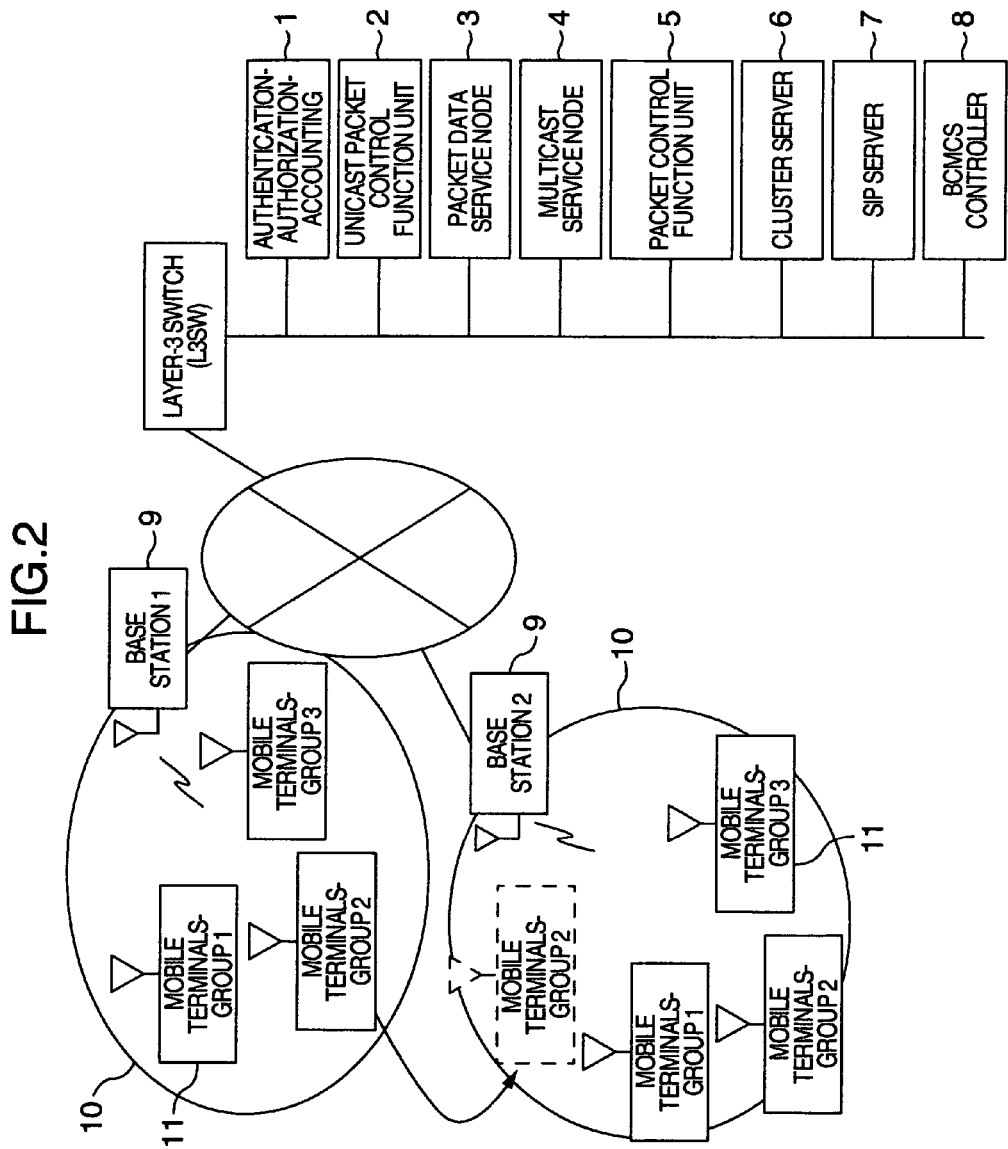
FIG. 2 is the diagram for illustrating the one embodiment of the cluster-communications system application based on BCMCS.
Figure 3:
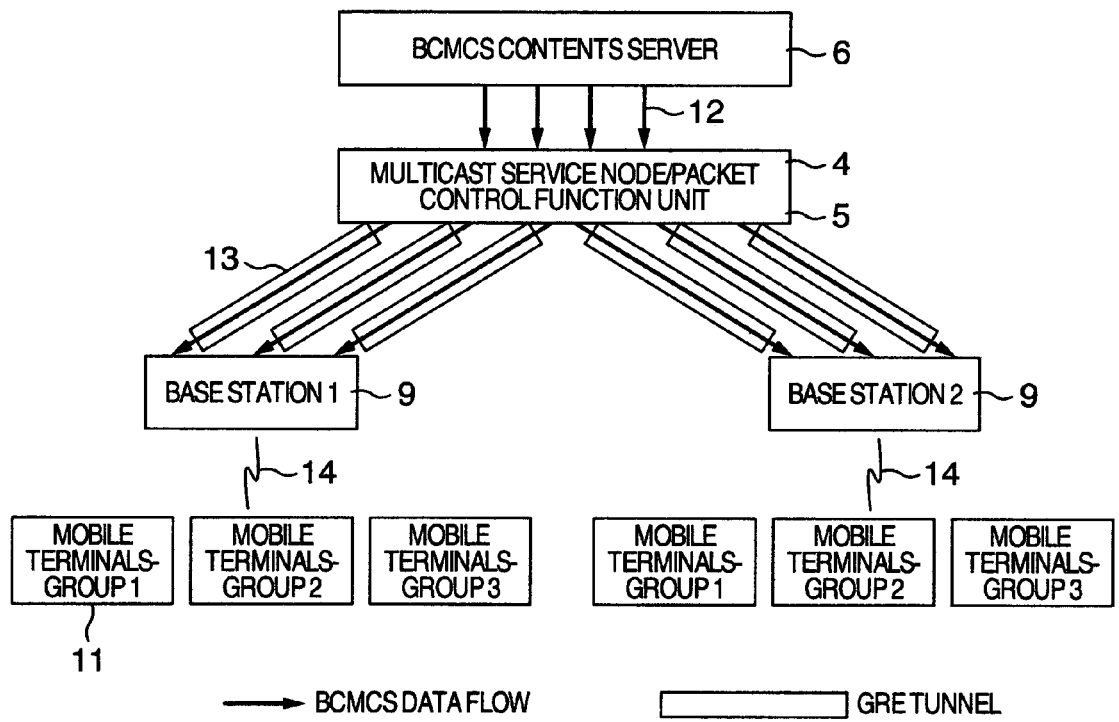
FIG. 3 is the diagram for illustrating the flow of the BCMCS data transfer in the embodiment illustrated in FIG. 2.
Figure 4:
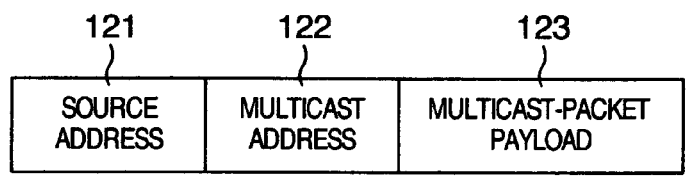
FIG. 4 is the diagram for illustrating the format of the IP packet of the multicast data flow.

In the present invention, in comparison with FIG. 2, a multicast processing server 15 is employed in substitution for the packet control function unit 5, the multicast service node 4, and the BCMCS controller 8. Incidentally here, although the multicast processing server is selected as the example, function of a broadcast processing server can also be included of course.

Figure 8:
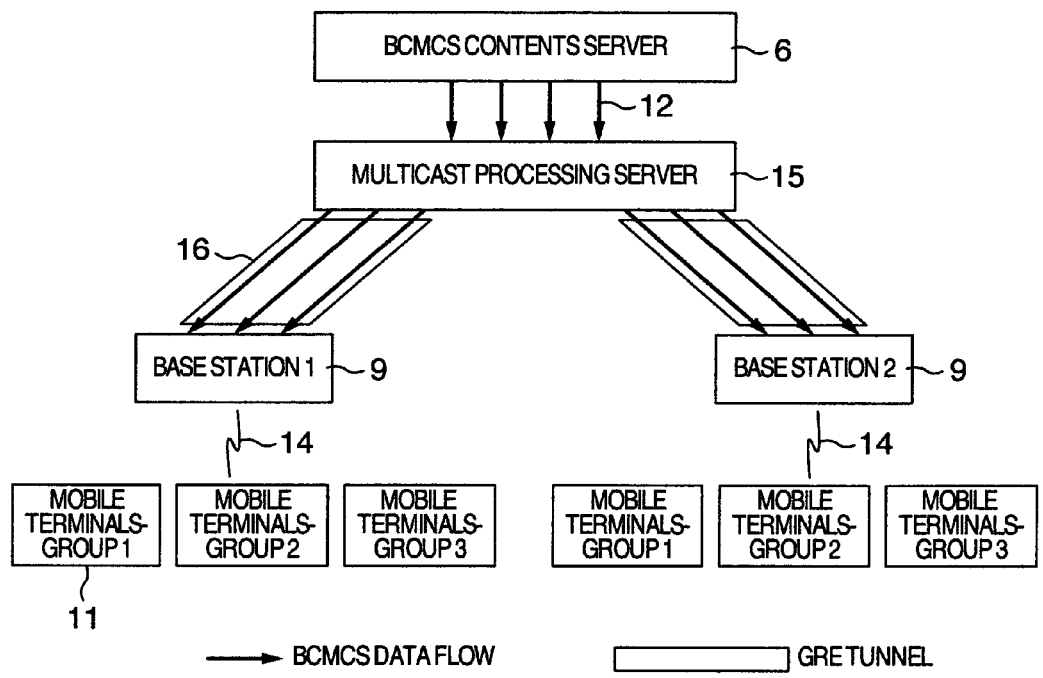
FIG. 8 is a diagram for illustrating flow of the BCMCS data transfer to which the technological idea of the present invention in the embodiment illustrated in FIG. 7 is applied.

FIG. 8 is a diagram for illustrating flow of the BCMCS data transfer to which the proposal of the present invention in the embodiment illustrated in FIG. 7 is applied. Here, a plurality of BCMCS data flows are encapsulated into one GRE tunnel 16. Accordingly, one GRE identifier can correspond to a plurality of BCMCS_FLOW_IDs. Here, a possibility is not excluded that a plurality of GRE tunnels can exist. In the present invention, it is proposed to employ and define BCMCS_GRE_ID as the identifier of the GRE tunnel 16. This identifier, which is reserved in figure spaces of BCMCS_FLOW_IDs, is used for the GRE tunnel 16 alone. Consequently, when BCMCS_FLOW_IDs are assigned in the multicast processing server 15, a certain figure is reserved for the GRE tunnel in advance.

Figure 5:
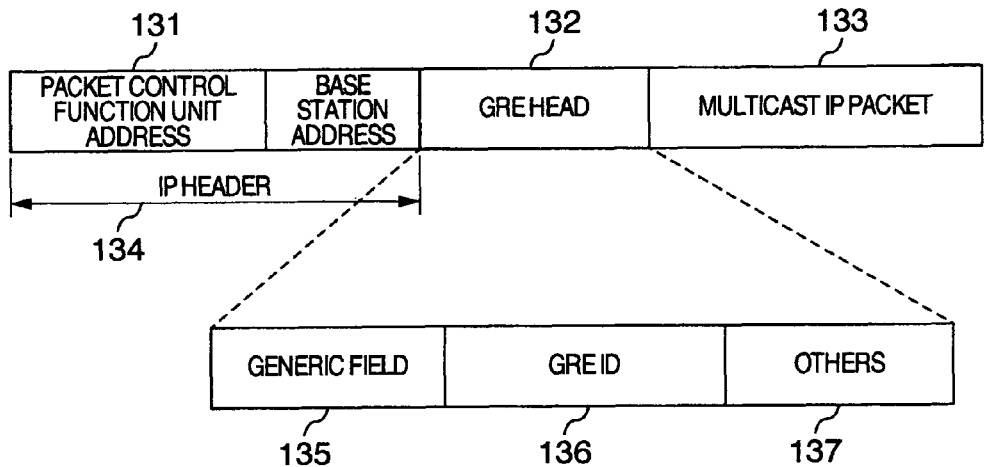
FIG. 5 is the diagram for illustrating the IP packet format of the GRE tunnel in the access network.
Figure 6:
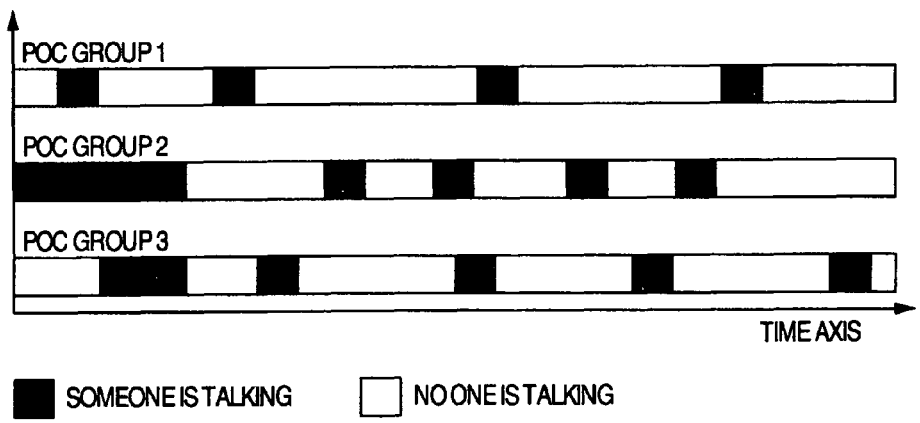
FIG. 6 is the diagram for illustrating the situation of the representative data flow in the PoC service.
Figure 9:
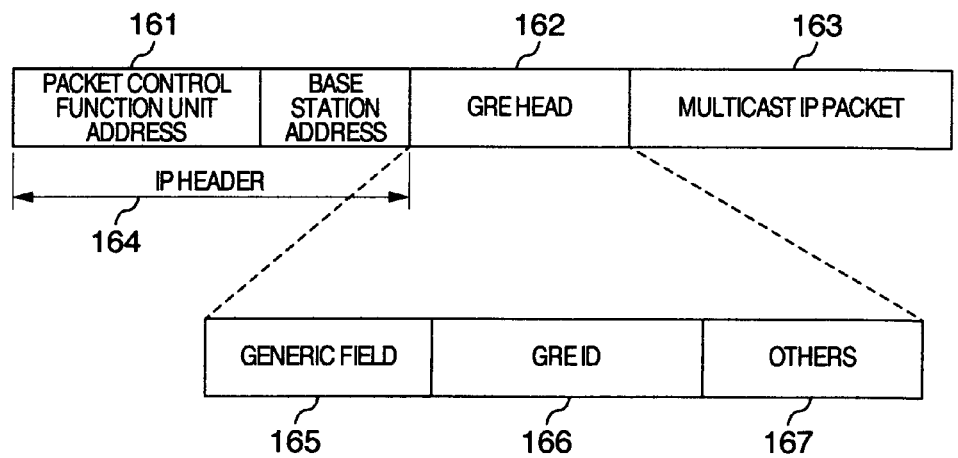
FIG. 9 is a diagram for illustrating IP packet format of the GRE tunnel to which the technological idea of the present invention is applied in the access network.

FIG. 9 is a diagram for illustrating IP packet format of the GRE tunnel to which the proposal of the present invention is applied in the access network. This format is basically the same as the format of the GRE tunnel illustrated in FIG. 5. The content of the GRE identifier field, however, is BCMCS_GRE_ID 166 that is specially reserved.

Figure 10:
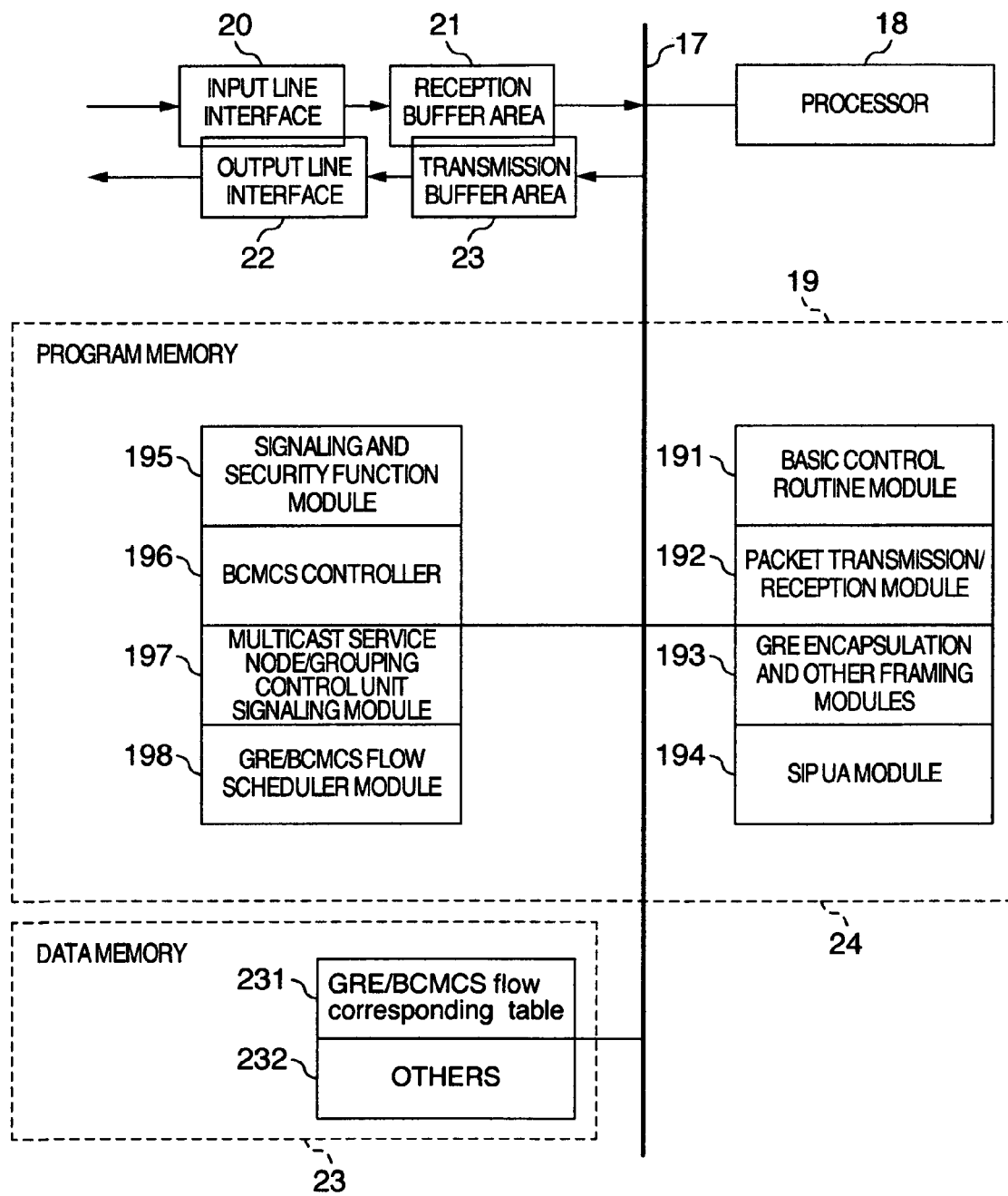
FIG. 10 is a diagram for illustrating internal structure of the multicast processing server according to the present invention.

FIG. 10 is a diagram for illustrating internal structure of the multicast processing server 15 according to the present invention. The network interface includes an input line interface 20 and an output line interface 22. Also, the network interface includes a reception buffer 21 to which the input line interface 20 and an internal bus 17 are connected, and a transmission buffer 23 to which the output line interface 22 and the internal bus 17 are connected. Moreover, at least a processor 18, a program memory 19, and a data memory 23 are connected to the internal bus 17. The program memory 19 memorizes therein function modules to be executed by the processor 18. These function modules are at least as follows: A packet transmission/reception module 192, GRE encapsulation and other framing modules 193 for addressing GRE-tunnel-related manipulations within the access network, a SIP UA module 194, a signaling and security function module 195, a BCMCS-controller function module 196, and a basic control routine module 191 for selecting and starting up the other modules.

Also, in the present invention, the program memory 19 further stores therein a generic routing encapsulation/multicast broadcast service scheduler module (GRE/BCMCS flow scheduler module) 198.

The GRE/BCMCS flow scheduler module 198 performs the following operations concretely:

1. When the GRE/BCMCS flow scheduler module 198 receives a BCMCS-data-flow request message, it processes the mapping relation between the GRE tunnel and the BCMCS data flows.

2. It assigns a new BCMCS_GRE_ID to the GRE tunnel.

3. It collects GRE-tunnel-related available resource information (e.g., bandwidth limitation) from the base-station controllers.

4. It performs the BCMCS data flow scheduling, depending on parameters of the BCMCS data flows and situation of the resource limitation at the base-station controllers.

5. It updates the BCMCS data flows by performing maintenance of the signaling interface.

6. It performs maintenance of a GRE/BCMCS flow correspondence table.

Also, the data memory 23 of the multicast processing server 15 stores therein the GRE/BCMCS flow correspondence table 231. Information stored here becomes grounds for performing the BCMCS data flow scheduling at the GRE/BCMCS flow scheduler module 198.

Multicast IP packets, which are controlled by the basic control routine module 191 and memorized into the reception buffer 21, are sequentially read by the packet transmission/reception module 192. The BCMCS-controller function module 196, first, checks source address and destination address of a multicast IP packet that it has received. If this multicast IP packet is not equivalent to a BCMCS data flow already registered, it turns out that this packet will be discarded. After that, the basic control routine module 191 passes this packet to the GRE/BCMCS flow scheduler module 198. This module 198 checks the GRE/BCMCS flow correspondence table 231 with respect to contents of this packet, then performing the scheduling of this packet based on contents of the table and local strategy. The packet subjected to the scheduling is then passed to the GRE encapsulation and other framing modules 193, where the BCMCS-related encapsulation is applied to the scheduled packet. Finally, the basic control routine module 191 transmits the encapsulated GRE packet by passing the packet to the transmission buffer 23. In some case (e.g., when the base station resource at present is lacking), the GRE packet is temporarily memorized into the data memory 23 to be on standby for the transmission, depending on the result of the scheduling.

FIG. 11 is a diagram for illustrating representative structure of the GRE/BCMCS flow correspondence table 231 according to the present invention. Reference numeral 231-1 denotes identifiers of the base station/base-station controllers, 231-2 denotes the corresponding IP addresses, 231-3 denotes BCMCS_GRE_IDs assigned by the GRE/BCMCS flow scheduler module 198, and 231-4 stores resource reserve information at the base station/base-station controllers such as bandwidth limitation. These pieces of information have an exceedingly important meaning for the dynamical transfer scheduling performed by the GRE/BCMCS flow scheduler module 198. Reference numeral 231-5 denotes BCMCS_GRE_ID multicast addresses/ports. On the table, the data flows describe 231-6 and session status. Reference numeral 231-7 stores therein information on each BCMCS data flow (such as, e.g., start/temporary halt and termination after 16 seconds). These pieces of information have an exceedingly important meaning for the dynamical transfer scheduling performed by the GRE/BCMCS flow scheduler module 198. For example, in the case of the cluster communications, if a member to talk with does not exist within a cluster, data to be transmitted within the cluster does not exist, either. At this time, the multicast processing server 15 updates the session information 231-7 of the corresponding cluster. Based on these pieces of information, the GRE/BCMCS flow scheduler module 198 will not assign the resource to the corresponding BCMCS data flow.

According to the definition of Open Mobile Alliance (OMA), time interval of each PoC cluster communication burst is less than 30 seconds. In some cases, the other cluster application imposes a time limitation on the time interval of data. Information similar to this is stored into the GRE/BCMCS flow correspondence table 231. Based on the information like this and the local strategy, the GRE/BCMCS flow scheduler module 198 finds it possible to perform the resource scheduling effectively.

Also, the table 231 includes base station/base-station controller items 231-9 as well. A plurality of BCMCS data flow items 231-10 can be affixed to the individual base station/base-station controller items 231-9. Each BCMCS data flow item 231-10 corresponds to one BCMCS data flow that each base station/base-station controller is required to receive.

Figure 15:
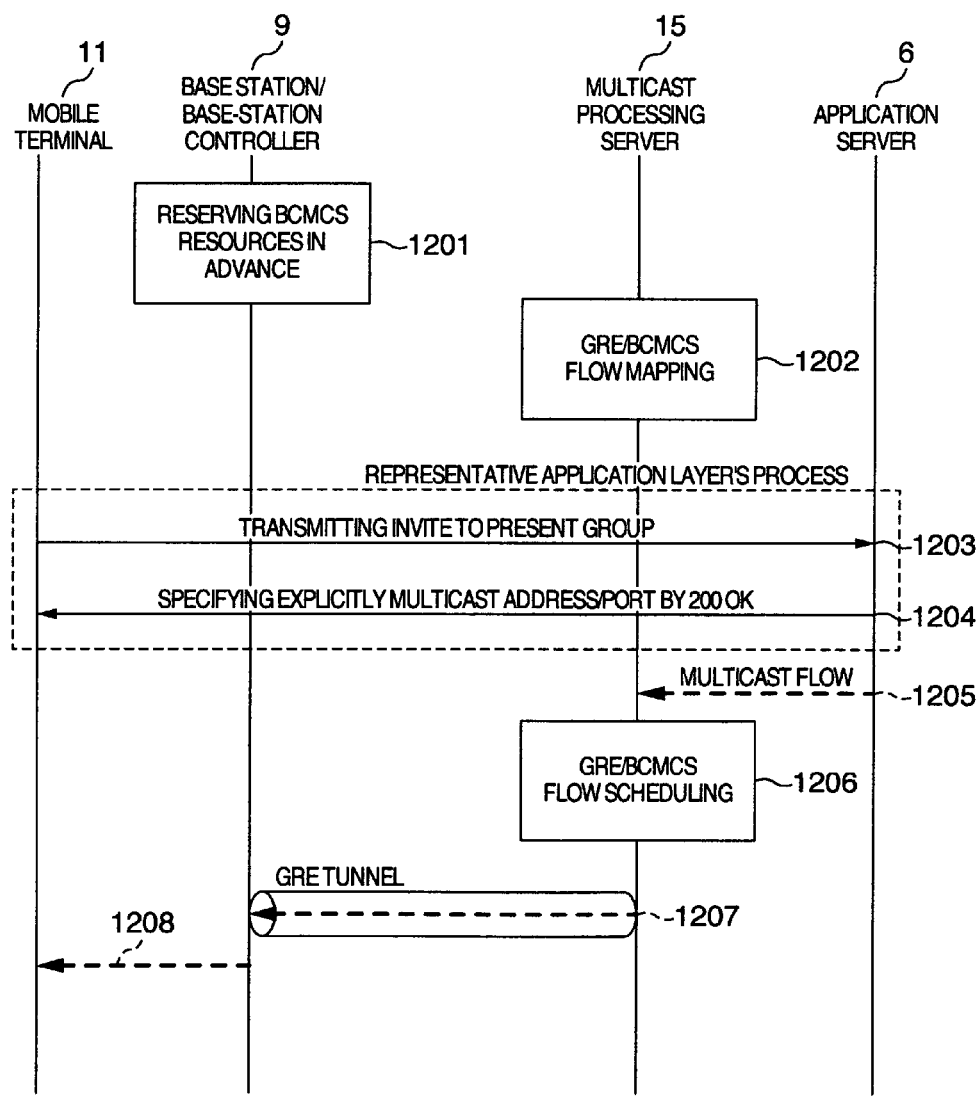
FIG. 15 is a diagram for illustrating a message for establishing static BCMCS data flow according to the present invention.

FIG. 15 is a diagram for illustrating a message for establishing a static BCMCS data flow according to the present invention. Here, "static" means that flow resources are distributed in advance by both of communication parties concerned; whereas "dynamical" means that the flow resources are not distributed in advance, but are determined by both parties' dynamically consulting about the distribution with each other.

In FIG. 15, the multi-party cluster application of SIP is assumed which has been briefly touched on in the present invention.

In the case of the other types of applications, it is good enough for the network provider to replace a message 1203 by a session-establishing message process corresponding thereto. At a step 1201, the base station/base-station controller 9 has reserved BCMCS resources in advance. There exist many methods for reserving resources. For example, the mobile provider can distribute resources which are needed to be statically reserved manually. Incidentally, the multicast processing server 15 is required to complete the mapping of the GRE/BCMCS flows at a step 1202.

At a step 1203, the mobile terminal 11 transmits an INVITE message to the application server 6. After having received the INVITE message, at a step 1204, the application server 6 transmits an OK confirmation message, thereby specifying the multicast address/port explicitly. After termination of the application session-establishing process, at a step 1205, the application server 6 transmits an IP multicast flow to the multicast processing server 15. The multicast address and port need to be deployed in advance. Having received the IP multicast packet transmitted from the application server 6, the multicast processing server 15 performs the scheduling of the GRE/BCMCS flow (step 1206). After that, at a step 1207, the scheduled IP packet is encapsulated based on the result of the scheduling. After that, the encapsulated GRE packet is transmitted to the base station/base-station controller 9 via the GRE tunnel. The base station/base-station controller 9 decapsulates the encapsulated GRE packet that it has received, then transmitting the GRE packet to the mobile terminal 11 via a BCMCS physical channel.

FIG. 12 is a diagram for illustrating a message for establishing the dynamical BCMCS data flow according to the present invention. In FIG. 12, the multi-party cluster application of SIP is assumed which has been briefly touched on in the present invention.

First, as is the case with the static BCMCS system, the BCMCS resources can be reserved in advance. Also, as the resource reserve, a step 1301 can also be executed when the first mobile terminal starts to make registration into the BCMCS service. At a step 1302, the mobile terminal activates the application session. In this case, the application server 6 transmits a SIP INVITE message 1303 to the multicast processing server 15. This message includes at least flow description and cluster member description. At a step 1304, the multicast processing server 15 performs the GRE/BCMCS flow mapping. If a change occurs in some information during execution of the session, the application server 6 transmits a message (e.g., SIPre-INVITE or Update message is used) to the multicast processing server 15, thereby performing the update.

At the step 1304, the multicast processing server 15 performs the mapping of the generic routing encapsulation (GRE)/BCMCS flow, depending on contents of the message 1303 and status of the access network. After that, the server 15 assigns the BCMCS_FLOW_IDs to all of the multicast flows from the application servers 6. According to the definition of 3GPP2, the BCMCS_FLOW_IDs and the multicast addresses/ports are brought into a one-to-one correspondence relationship with each other. At a step 1306, the server 15 notifies the mobile terminal 11 of these pieces of information. After that, the mobile terminal 11 activates a dynamical BCMCS registration (i.e., steps 1308, 1309, 1310, and 1311) in accordance with the process of 3GPP2. At the step 1310, the base station/base-station controller 9 notifies the mobile terminal 11 of the BCMCS_GRE_ID via the interface.

After termination of the dynamical BCMCS registration process, at a step 1312, the multicast processing server 15 starts up reception of the multicast flows by transmitting an IGMP join message. When the multicast processing server 15 receives the multicast flows from the application server 6, the server 15 performs the scheduling of the GRE/BCMCS flow (step 1313). After that, at a step 1314, the scheduled IP packet is encapsulated based on the result of the scheduling. After that, the encapsulated GRE packet is transmitted to the base station/base-station controller 9 via the GRE tunnel. The base station/base-station controller 9 decapsulates the encapsulated GRE packet that it has received, then transmitting the GRE packet to the mobile terminal 11 via the BCMCS physical channel.

In the case of the static BCMCS, the flow mapping to be performed at the multicast processing server 15 also needs to be set in advance.

FIG. 13 is a diagram for illustrating a representative flowchart for illustrating establishment of the dynamical data flow mapping inside the multicast processing server 15 according to the present invention. When the multicast processing server 15 receives a SIP INVITE message 1401 from the application server 6, the server 15 checks contents of the message first. This message includes at least flow description and cluster member description. If the information on the BCMCS data flow and the item in the GRE/BCMCS flow correspondence table 231 are in contradiction with each other, it means that the related resource has been occupied by a different BCMCS data flow. At this time, the multicast processing server 15 transmits a denial message 1410 (SIP 406 unacceptable message is used in the present invention) to the application server 6.

If the BCMCS data flow has no item in the GRE/BCMCS flow correspondence table 231, the server 15 checks the corresponding base station/base-station controller item within the table 231 (step 1403). As a result of the check, if it has been found out that resources such as bandwidth sufficient to support this BCMCS data flow are unavailable, the GRE/BCMCS flow scheduler module 198 transmits the denial message 1410 to the application server 6. In some cases, the BCMCS service cannot be supported only for part of members within the cluster. At this time, the GRE/BCMCS flow scheduler module 198 specifies explicitly, in the denial message 1410, a member that cannot be supported (step 1409). If the BCMCS data flow has been supported, the GRE/BCMCS flow scheduler module 198 assigns BCMCS_FLOW_ID to this BCMCS data flow (step 1405), thus establishing the mapping between the BCMCS_FLOW_ID and the BCMCS_GRE_ID. After that, at a step 1407, the module 198 updates the GRE/BCMCS flow correspondence table 231. Finally, the module 198 transmits a success message 1408 (SIP 200 OK message is used in the present invention) to the application server 6. In this process, the mapping relationship between the BCMCS data flow and the BCMCS_GRE_ID has been established.

At a step 1404, the server 15 checks usage situation of the BCMCS resources at the related base station. For example, as illustrated in FIG. 11, three BCMCS data flows exist at a base station 1 (ANID is 0x0401). The IP address of the base station 1 is 10.10.12.227. The base station 1 has already reserved partial empty port resources in the BCMCS service, and thus is capable of supporting 128-kbps service flow amount simultaneously. Incidentally, these three BCMCS data flows include ① BCMCS flow for PoC session (BCMCS_FLOW_ID1: 0x4001; address/port: 225.0.0.10/10093; flow description: 30 kbps; 50 packets per second; one talk time is 30 seconds at the longest; session status: idle), ② BCMCS flow for VoIP conference session (BCMCS_FLOW_ID2: 0x4002; address/port: 225.0.0.11/10093; flow description: 20 kbps; 50 packets per second; silence detection function is present; session status: active), and ③ BCMCS flow for session download (BCMCS_FLOW_IDn: 0x4003; address/port: 225.0.0.12/10093; flow description: 64 kbps; session status: active).

As the embodiment illustrated in FIG. 13, the multicast processing server 15 has received the SIP INVITE message 1401 transmitted from the other application server 6. For example, this message includes a new PoC session (flow description: 30 kbps; 50 packets per second; one talk time is 30 seconds at the longest). Theoretically, the 128-kbps bandwidth prevents the base station from supporting these sessions (whose total bandwidth is equal to 30+20+64+30=144 kbps). At this time, the GRE/BCMCS flow scheduler module 198 checks whether or not this new PoC session can be supported at the base station. As the grounds for the support judgment, it is conceivable that a plurality of local strategies exist. Here, however, the simplest strategy will be given as the example. The session download is not sensitive to the delay, and thus is negligible. In the VoIP conference session, as few as 2-kbps flow amount exist at the time of the silence. In the PoC session, no flow amount exists at the time of the idle status. Accordingly, the application of statistics makes it possible to estimate the actual flow amount in the VoIP conference session as being 20 kbps×90%=18 kbps, and the actual flow amount in the PoC session as being 30 kbps×70%=21 kbps. Consequently, since the resource occupation estimated at present is equal to 39 kbps, the base station finds it possible to support this new session. When all of the sessions are used and operated in their peak flow amount statuses simultaneously, the GRE/BCMCS flow scheduler module 198 finds it possible to perform the scheduling for this base station effectively.

Figure 14:
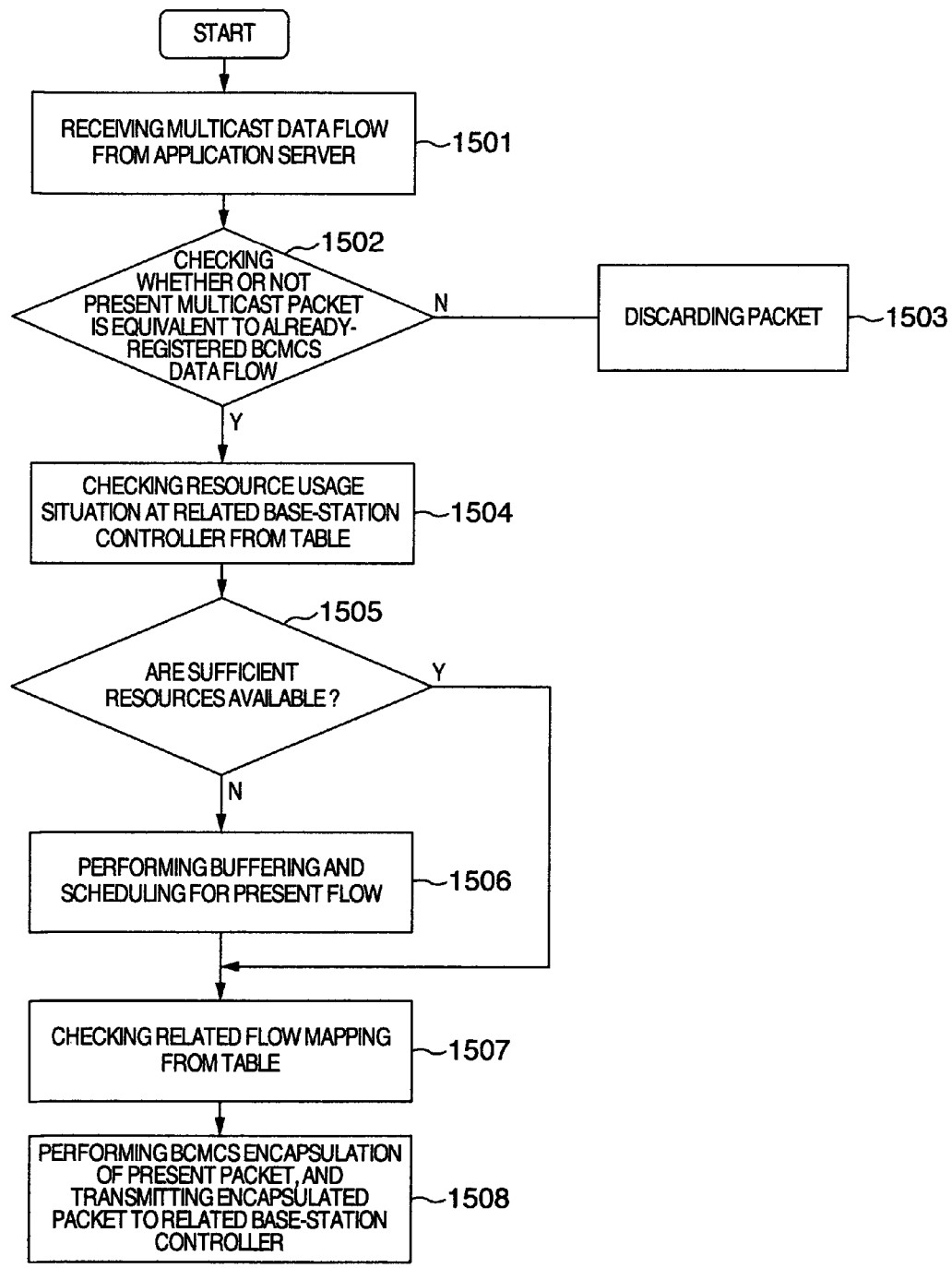
FIG. 14 is a representative flowchart for illustrating the scheduling of the multicast data inside the multicast processing server according to the present invention.

FIG. 14 is a representative flowchart for illustrating the scheduling of the multicast data inside the multicast processing server 15 according to the present invention. When the GRE/BCMCS flow scheduler module 198 in the multicast processing server 15 receives an IP multicast packet from the application server 6 (step 1501), the module 198 checks whether or not the IP multicast packet is equivalent to the BCMCS data flow already registered (step 1502). If the packet is invalid, this packet will be discarded (step 1503). After that, based on the acquired information and local strategy, the module 198 evaluates the present usage situation of the resources at the related base station/base-station controller 9 (step 1504). Then, if the resources are sufficient, the module 198 encapsulates the packet, then transferring the encapsulated packet to the access network directly. In this case, the GRE/BCMCS flow scheduler module 198 checks the related flow mapping within the GRE/BCMCS flow correspondence table 231 (step 1507), then transmitting the related information at a step 1508. Meanwhile, if the resources are insufficient, the GRE/BCMCS flow scheduler module 198 performs the scheduling of the IP multicast packet based on a certain buffer and the scheduling mechanism (step 1506). After that, when the resources become available, the module 198 transfers the encapsulated packet to the access network at the step 1508.

The present invention provides the following effects:

(1) It is possible at the gateway of the access network to know usage situation of the BCMCS resources at the related base station. This feature makes it possible to support the scheduling and analysis function based on the session.

(2) All of the BCMCS data flows encapsulated in the GRE tunnels are capable of utilizing all of the BCMCS resources sufficiently.

(3) The effective transfer scheduling allows the CDMA2000 mobile communications system to support a larger number of BCMCS data flows by using similar aerial interface resources.

(4) When a plurality of BCMCS data flows are incorporated into one GRE tunnel, the variations at a plurality of base stations need not be performed even if the number of the BCMCS data flows increases.

(5) A plurality of buffering queues need not be generated for a plurality of BCMCS data flows at a base station. This feature makes it possible to effectively reduce a delay in the multicast data processing at the base station.

(6) It is completely unnecessary to make modifications to the mobile terminals and the BCMCS data server. This feature results in none of the influences exerted on the Application Layer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communications controller which is linked to an application server by way of a network interface, and which is linked further to a plurality of terminals by way of a plurality of base stations, said communications controller, comprising:
said network interface for receiving information from said application server, and transmitting said information to said plurality of base stations by utilizing multicast communications flows, said multicast communications flows being established between said application server and said plurality of base stations; and
a control unit that reserves a resource for multicast communications for, when, said network interface receives request information for requesting establishment of a new multicast communications flow,
judging whether or not said new multicast communications flow can be established by the reserved resource of a base station with respect to a base station, based on communications quality parameters of the other multicast communications flows already established between said application server and said plurality of base stations, and a communications quality parameter of said new multicast communications flow, said new multicast communications flow being transferred by way of said base station, and
establishing said new multicast communications flow by the reserved resource of a base station, if a result of said judgment on said base station is YES, said new multicast communications flow being transferred by way of said base station, wherein
said network interface transmits said information to each of said plurality of base stations in such a manner that said multicast communications flow is incorporated into one communications tunnel,
said control unit, when said network interface receives said information:
requests said establishment of said new multicast communications flow,
judges whether or not said new multicast communications flow can be established with respect to a base station, based on communications quality parameters of said other multicast communications flows incorporated into said communications tunnels, and a communications quality parameter of said new multicast communications flow, said new multicast communications flow being transferred by way of said base station,
judges whether a summation of a product of said communications bandwidths and said weight coefficients of said other multicast communications flows incorporated into said communications tunnels already established with said base station, and a product of said communications bandwidth and said weight coefficient of said new multicast communications flow has exceeded a communications bandwidth limit of said base station, said new multicast communications flow being transferred by way of said base station,
establishes said new multicast communications flow if a result of said judgment on said base station is YES, said new multicast communications flow being transferred by way of said base station, said communications quality parameters are communications bandwidths and weight coefficients, and
establishes said new multicast communications flow if said summation has not exceeded said communications bandwidth limit of said base station, a summation of said communications bandwidth of said new multicast communications flow and said communications bandwidths of said already-established multicast communications flows of said base station having exceeded said communications bandwidth limit of said base station, and wherein
said weight coefficients are determined according to service of said multicast communication flow.

2. The communications controller according to claim 1, wherein said communications quality parameters are communications bandwidths, and said control unit, when said network interface receives said request information for requesting said establishment of said new multicast communications flow, judging whether or not said new multicast communications flow can be established, by judging whether summation of a summation of said communications bandwidths of already-established multicast communications flows of a base station and said communications bandwidth of said new multicast communications flow has exceeded a communications bandwidth limit of said base station, said new multicast communications flow being transferred by way of said base station, and
establishing said new multicast communications flow if a result of said judgment is found to be that said summation has not exceeded said communications bandwidth limit.

3. The communications controller according to claim 1, further comprising:
a memory for memorizing a multicast-communications-flow information table, said multicast-communications-flow information table storing multicast communications flow IDs for identifying said multicast communications flows, communications tunnel IDs for identifying said communications tunnels each of which is established with each of said base stations, and said multicast-communications-flow information table for indicating a correspondence relationship between said multicast communications flows and said communications quality parameters, and wherein
said control unit makes said judgment by making reference to said multicast-communications-flow information table,
said network interface transmitting information to said application server, said information indicating whether or not said new multicast communications flow is to be established.

4. The communications controller according to claim 3, wherein said multicast-communications-flow information table is updated when communications with respect to said terminals are halted.

5. The communications controller according to claim 1, wherein said control unit controls said network interface so that said multicast communications flows incorporated into said communications tunnels co-use communications resources of said communications tunnels.

6. The communications controller according to claim 1, wherein said communications quality parameters are acquired from an INVITE message, said INVITE message being transmitted from each of said terminals by way of said application server in a registration process of said terminals.

7. The communications controller according to claim 1, wherein, when said communications bandwidths of said base station cannot satisfy demand for simultaneous communications of said multicast communications flows, a buffering is applied to some partial multicast communications flows out of said multicast communications flows.

8. The communications controller according to claim 1, wherein said base stations are wireless base stations.

9. A communications control method for receiving information from an application server, and transmitting said information to a plurality of base stations by utilizing multicast communications flows, said multicast communications flows being established between said application server and said plurality of base stations, said communications control method, comprising:
- a reception step of receiving, from said application server, a request information for requesting establishment of a new multicast communications flow;
- a reserving step of reserving a resource of a base station for multicast communications;
- a judgment step of judging whether or not said new multicast communications flow can be established by the reserved resource with respect to a base station, based on communications quality parameters of the other multicast communications flows already established between said application server and said plurality of base stations, and a communications quality parameter of said new multicast communications flow, said new multicast communications flow being transferred by way of said base station;
- a multicast-communications-flow establishment step of establishing, by the reserved resource, said new multicast communications flow if a result of said judgment on said base station is YES, said new multicast communications flow being transferred by way of said base station; and
- a step of transmitting said information to each of said plurality of base stations in such a manner that said multicast communications flow is incorporated into one communications tunnel, wherein
- at said judgment step, it is judged whether or not said new multicast communications flow can be established with respect to a base station, based on communications quality parameters of said other multicast communications flows incorporated into said communications tunnels, and a communications quality parameter of said new multicast communications flow, said new multicast communications flow being to be transferred by way of said base station, and it is judged whether summation of product of said communications bandwidths and said weight coefficients of said other multicast communications flows incorporated into said communications tunnels already established with said base station, and product of said communications bandwidth and said weight coefficient of said new multicast communications flow has exceeded a communications bandwidth limit of said base station, said new multicast communications flow being transferred by way of said base station,
- at said multicast-communications-flow establishment step, said new multicast communications flow is established if a result of said judgment on said base station is YES, said new multicast communications flow being transferred by way of said base station, and said new multicast communications flow is established if said summation has not exceeded said communications bandwidth limit of said base station,
- said communications quality parameters are communications bandwidths and weight coefficients, and
- a summation of said communications bandwidth of said new multicast communications flow and said communications bandwidths of said already-established multicast communications flows of said base station have exceeded said communications bandwidth limit of said base station, and wherein
- said weight coefficients are determined according to service of said multicast communication flow.

10. The communications control method according to claim 9, wherein
said communications quality parameters are communications bandwidths, and, at said judgment step, it is judged whether or not said new multicast communications flow can be established, by judging whether summation of a summation of said communications bandwidths of already-established multicast communications flows of a base station and said communications bandwidth of said new multicast communications flow has exceeded a communications bandwidth limit of said base station, said new multicast communications flow being transferred by way of said base station, and
at said multicast-communications-flow establishment step, said new multicast communications flow being established if result of said judgment is found to be that said summation has not exceeded said communications bandwidth limit.

11. The communications control method according to claim 9, wherein
there is provided a memory for memorizing a multicast-communications-flow information table, said multicast-communications-flow information table storing multicast communications flow IDs for identifying said multicast communications flows, communications tunnel IDs for identifying said communications tunnels each of which is established with each of said base Stations, and said multicast-communications-flow information table for indicating a correspondence relationship between said multicast communications flows and said communications quality parameters, and wherein at said judgment step, said judgment is made by making reference to said multicast-communications-flow information table, and further comprising a step of:
transmitting information to said application server, said information indicating whether or not said new multicast communications flow is to be established.

12. The communications control method according to claim 11, wherein
said multicast-communications-flow information table is updated when communications with respect to said terminals are halted.

13. The communications control method according to claim 9, wherein
said multicast communications flows incorporated into said communications tunnels co-use communications resources of said communications tunnels.

14. The communications control method according to claim 9, wherein
said communications quality parameters are acquired from an INVITE message, said INVITE message being transmitted from each of said terminals by way of said application server in a registration process of said terminals.

15. The communications control method according to claim 1, wherein
when said communications bandwidths of said base station cannot satisfy demand for simultaneous communications of said multicast communications flows, a buffering is applied to some partial multicast communications flows out of said multicast communications flows.

* * * * *

UNITED STATES PATENT AND TRADEMARK OFFICE
CERTIFICATE OF CORRECTION

| | | |
|---|---|---|
| PATENT NO. | : 8,363,584 B2 | Page 1 of 1 |
| APPLICATION NO. | : 12/071665 | |
| DATED | : January 29, 2013 | |
| INVENTOR(S) | : Yang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this
Eleventh Day of November, 2014

Michelle K. Lee
*Deputy Director of the United States Patent and Trademark Office*